United States Patent
Natarajan et al.

(10) Patent No.: US 10,435,543 B2
(45) Date of Patent: Oct. 8, 2019

(54) RUBBER OR ELASTOMER COMPOSITIONS AND PROCESSES FOR THEIR MANUFACTURING

(71) Applicant: LEIBNIZ-INSTITUT FUER POLYMERFORSCHUNG DRESDEN E.V., Dresden (DE)

(72) Inventors: Tamil Selvan Natarajan, Dresden (DE); Amit Das, Dresden (DE); Klaus Werner Stoeckelhuber, Freiberg (DE); Rene Jurk, Schwarzheide (DE); Hai Le Hong, Halle (DE); Sven Wiessner, Dresden (DE); Gert Heinrich, Hannover (DE)

(73) Assignee: LEIBNIZ-INSTITUT FUER POLYMERFORSCHUNG DRESDEN E.V., Dresden (DE)

( * ) Notice: Subject to any disclaimer, the term of this patent is extended or adjusted under 35 U.S.C. 154(b) by 0 days.

(21) Appl. No.: 15/600,110

(22) Filed: May 19, 2017

(65) Prior Publication Data
US 2017/0342240 A1   Nov. 30, 2017

(30) Foreign Application Priority Data
May 25, 2016   (DE) .................. 10 2016 209 098

(51) Int. Cl.
| | | |
|---|---|---|
| *C08L 7/02* | (2006.01) | |
| *C08L 9/04* | (2006.01) | |
| *C08L 9/06* | (2006.01) | |
| *C08L 9/10* | (2006.01) | |
| *C08L 13/02* | (2006.01) | |
| *B29C 35/02* | (2006.01) | |
| *C08K 3/013* | (2018.01) | |
| *C08K 5/00* | (2006.01) | |
| *C08K 5/09* | (2006.01) | |
| *C08L 9/00* | (2006.01) | |
| *C08L 7/00* | (2006.01) | |

(52) U.S. Cl.
CPC ............... *C08L 9/00* (2013.01); *B29C 35/02* (2013.01); *C08K 5/0025* (2013.01); *C08K 5/09* (2013.01); *C08L 7/00* (2013.01); *C08L 9/06* (2013.01); *C08L 13/02* (2013.01); *C08L 2205/22* (2013.01); *C08L 2207/04* (2013.01); *C08L 2666/08* (2013.01); *C08L 2666/34* (2013.01); *C08L 2666/64* (2013.01); *C08L 2666/72* (2013.01)

(58) Field of Classification Search
CPC .............................................. C08K 2201/011
See application file for complete search history.

(56) References Cited

U.S. PATENT DOCUMENTS

| | | | |
|---|---|---|---|
| 7,488,773 B2 * | 2/2009 | Pause | C08K 3/24 524/787 |
| 7,750,072 B2 | 7/2010 | Thompson-Colon et al. | |
| 8,333,903 B2 | 12/2012 | Rolland et al. | |
| 8,784,681 B2 | 7/2014 | Chen et al. | |
| 2011/0086941 A1 | 4/2011 | Therond et al. | |
| 2012/0041110 A1 * | 2/2012 | Rieth | C08K 5/1565 524/108 |
| 2013/0165554 A1 | 6/2013 | Weder et al. | |
| 2014/0030458 A1 | 1/2014 | Eibergen et al. | |
| 2015/0038038 A1 | 2/2015 | Korley et al. | |

FOREIGN PATENT DOCUMENTS

| | | |
|---|---|---|
| CA | 2472278 | 7/2003 |
| DE | 102006033350 | 1/2008 |
| WO | 2006/062610 | 6/2006 |
| WO | 2013/014318 | 1/2013 |
| WO | 2014/124293 | 8/2014 |

OTHER PUBLICATIONS

Mandal et al., Polym. Eng. and Sci., Jan. 1966, vol. 36, No. 2, pp. 283-287.*
Satoshi Mihara (Ph.D. Thesis, 2009).*
Arkema Emulsion Systems: Polymer Selection Guide. (Publication date unknown).*
Correa et al. Polimero, 25(4), 365-370, 2015.*
"Intelligenter Werkstoff"; Wikipedia; pp. 1-2.
German Office Action issued in Counterpart Patent Appl. No. DE 10 2016 209 098.4, dated Jan. 23, 2017.

* cited by examiner

*Primary Examiner* — Vu A Nguyen
(74) *Attorney, Agent, or Firm* — Greenblum & Bernstein, P.L.C.

(57) ABSTRACT

The present invention relates to rubber or elastomer compositions as can be used for vehicle tires, and to a method for the production of the rubber or elastomer compositions. The elastic modulus of the compositions can be adapted depending on the temperature and/or the application conditions, and is a cost-effective and easily implemented method for the production of the compositions. The rubber or elastomer compositions contain at least one rubber or elastomer matrix and at least 20 to 150 phr of a phase change material in solid or liquid form. The compositions may be made by mixing the at least one rubber and the at least 20 to 150 phr of a phase change material in solid or liquid form, or the at least one rubber is at least brought into contact with the phase change material, and further processing steps can be performed, and a vulcanization can be performed.

26 Claims, No Drawings

RUBBER OR ELASTOMER COMPOSITIONS AND PROCESSES FOR THEIR MANUFACTURING

CROSS-REFERENCE TO RELATED APPLICATIONS

The present application claims priority under 35 U.S.C. § 119(a) of German Patent Application No. 10 2016 209 098.4 filed May 25, 2016, the disclosure of which is expressly incorporated by reference herein in its entirety.

The present invention concerns the field of polymer chemistry and relates to rubber or elastomer compositions as can be used, for example, for intelligent materials for vehicle tires, in medicine and in aerospace, for example, in intelligent medical instruments, artificial muscles, robots, actuators, sensors, microelectromechanical systems, and to a method for the production of rubber or elastomer compositions of this type.

Intelligent materials are understood as meaning solids, liquids and gases that autonomously react to changing environmental conditions (for example, a temperature increase, a mechanical load, a change in the pH value) without external regulation (Wikipedia, German-language keyword "Intelligenter Werkstoff").

Generally, materials or compounds are known which can alter their properties when different stimuli are applied.

For example, a cement reinforced with synthetic para-aramid fibers is known according to US 2011/0086941 A1, in which the cement obtains improved mechanical properties in terms of elasticity by means of the fibers.

Shaping materials and structures, in particular materials and structures mimicking natural materials and structures, are known from US 2015/0038038, wherein a polymer composite contains a matrix, which contains a polymer film, and a filler that is an electrospun polymer mat.

According to CA 2472278 A1, the use of paraffin-containing powders as a phase change material (PCM) in polymer composites for cooling elements is known.

According to US 2013/0165554 A1, polymer nanocomposites composed of a matrix polymer and nanoparticles are known in which a reversible change in the stiffness and strength occurs as a reaction to a stimulus. In these polymer nanocomposites, the matrix polymer has a relatively low elastic modulus and low strength, and the nanoparticles have a relatively high elastic modulus (compared to the matrix polymer) and high strength. The particle/particle interactions can be changed by means of a stimulus, whereby the mechanical properties of the entire material are changed. Chemical or electrical stimuli can be used. According to a preferred embodiment, a chemical regulator is furthermore used to facilitate the changes in the mechanical properties. In a particular embodiment, polymers reinforced with cellulose fibers, the properties of which polymers have been adapted, are known as polymer nanocomposites.

The known, in particular elastic, materials with a reversible change in the, in particular mechanical, properties are normally materials with high strength and stiffness.

It is therefore desirable to specify an elastic material that adapts to the application conditions depending on the temperature and thereby has a highest possible strength and stiffness.

Elastomers are shape-retaining, yet elastically deformable plastics, the glass transition point of which is below the application temperature. These plastics can be elastically deformed under tensile and pressure loads, but afterwards return to their original, undeformed shape. Elastomers are used as material for tires, rubber bands, sealing rings, etc. The best known elastomers are the vulcanizates of natural rubber and silicone rubber (Wikipedia, German-language keyword "Elastomere").

Elastomer composites can be mechanically adaptive and are in this case assigned to the class of stimuli-responsive polymers, in which polymers the changes in mechanical property can be observed with a change in stimulus such as electricity, temperature, solvent, charges (U.S. Pat. No. 8,784,681 B2, WO 2014 124 293 A1).

Thermoresponsive polymers are polymers that change their physical properties markedly and intermittently with the temperature (Wikipedia, German-language keyword "thermoresponsive Polymere").

A disadvantage of the known solutions is that, in these solutions, the strength of brittle or rigid materials is increased, but no elastomer compositions are yet known for which mechanical properties in terms of strength and stiffness can adequately change depending on the temperature. A method for the production of an elastomer composition with mechanical properties in terms of strength and stiffness that are adequately modifiable depending on the temperature is also not yet known.

The object of the invention is the specification of rubber or elastomer compositions, wherein in particular the elastic modulus of the compositions can be adapted depending on the temperature and/or the application conditions, and a cost-effective and easily implemented method for the production thereof.

The object is attained by the invention disclosed in the claims. Advantageous embodiments are the subject of the dependent claims, wherein the invention also includes combinations of the individual dependent claims within the meaning of an and-operation, provided that they are not mutually exclusive.

The object is attained by the specification of rubber or elastomer compositions that contain at least one rubber or elastomer matrix and at least 20 to 150 phr of a phase change material in solid or liquid form, and wherein one or more auxiliary materials can be present.

Advantageously, the phase change material of the rubber or elastomer compositions has a particle size of ≤1 µm, even more advantageously of 0.01 µm-0.5 µm.

Also advantageously, the phase change material of the rubber or elastomer compositions is present at 30 to 80 phr.

Further advantageously, the phase change material of the rubber or elastomer compositions is present in the matrix in a homogeneously distributed manner or in a graduated distribution.

The matrix of the rubber or elastomer compositions according to the invention is advantageously produced from at least one natural rubber and/or at least one synthetic rubber, more advantageously styrene-butadiene rubber (SBR), butadiene rubber (BR), butyl rubber (IIR), acrylonitrile-butadiene rubber (NBR), carboxylated NBR, hydrogenated NBR, epichlorohydrin-ethylene oxide rubber (GECO), acrylic rubber (ACM), ethylene-propylene-diene rubber (EPDM), polyurethane rubber (PU), fluorinated rubber (FKM) and/or silicone rubber (VMQ), or from a mixture of the rubbers.

Water, one or more paraffins or one or more non-paraffins, one or more inorganic salt hydrates, one or more eutectic alloys, one or more metals and/or one or more metal compounds are advantageously present as a phase change material of the rubber or elastomer compositions.

More advantageously, $CH_3—(CH_2)_n—CH_3$ with n=14-34 is present as paraffin and ester, formic acid, caprylic acid, glycerin, D-lactic acid, methyl palmitate, camphenilone, docosyl bromide, caprylone, phenol, 1-cyclohexyloctadecane, 9-heptadecanone, 4-heptadecanone, 3-heptadecanone, 2-heptadecanone, p-toluidine, cyanamide, methyl eicosanoate, hydroxycinnamic acid, cetyl alcohol, α-naphthylamine, camphene, o-nitroaniline, thymol, methylbehenic acid, diphenylamine, p-dichlorobenzene, oxalate, hypophosphorous acid, o-xylene dichloride, nitronaphthalene, trimyristin, beeswax, glycolic acid, p-bromophenol, azobenzene, acrylic acid, phenyl acetate, thiosinaminum, bromocamphor, durene, benzylamine, methyl bromobenzoate, alpha naphthol, glutaric acid, p-xylene dichloride, catechinic acid, quinone, acetanilide, succinic anhydride, benzoic acid, stilbene, benzamide, and/or aliphatic acids, more advantageously caprylic acid, elaidic acid, lauric acid, pentadecanoic acid, heptadecanoic acid, tristearin, myristic acid, palmitic acid, stearic acid, acetamide and/or salts thereof, more advantageously zinc stearate, glyceryl stearate, methyl fumarate, potassium laurate and/or glyceryl laurate are present as a non-paraffin.

Further advantageously, at least one filler, at least one vulcanizing agent, at least one curing agent, at least one crosslinker, at least one accelerator and/or at least one activator, more advantageously sulfur, peroxide and/or zinc oxide (ZnO), are present as auxiliary material of the rubber or elastomer compositions according to the invention.

Particularly advantageously, reinforcing filler, more advantageously carbon black, calcium carbonate, layered silicate, carbon nanotubes, hydrotalcite, graphene, silica, and/or non-reinforcing filler, more advantageously clay/alumina, calcium carbonate, talcum, and/or antioxidants, more advantageously trimethylquinolone (TQ), are present as filler for the rubber or elastomer compositions.

Advantageously, the phase change material of the rubber or elastomer compositions is polar, or the elastomer matrix and the phase change material of the rubber or elastomer compositions are polar.

The object of the invention is furthermore attained by the specification of a method for the production of rubber compositions, wherein at least one rubber and at least 20 to 150 phr of a phase change material in solid or liquid form are used, wherein one or more auxiliary materials can be used, the composition is mixed or the at least one rubber with or without auxiliary materials can at least be brought into contact with the phase change material, and further processing steps can be performed.

The object of the invention is also attained by the specification of a method for the production of elastomer compositions, wherein at least one rubber and at least 20 to 150 phr of a phase change material in solid or liquid form are used, wherein one or more auxiliary materials can be used, and further processing steps can be performed, and either the phase change material is mixed with the at least one rubber and subsequently vulcanized, or the at least one rubber is mixed with or without one or more auxiliary materials and vulcanized without, or after completion of, further processing steps and subsequently at least brought into contact with the phase change material.

Advantageously, the mixed composition is rolled in a further method step.

Also advantageously, phase change material with a particle size of ≤1 μm, more advantageously of 0.01-0.5 μm, is used.

Likewise advantageously, 30 to 80 phr phase change material is used.

The phase change material is advantageously distributed in the matrix in a homogeneous or graduated manner.

The matrix of the rubber or elastomer compositions according to the invention is advantageously produced from at least one natural rubber and/or at least one synthetic rubber, more advantageously styrene-butadiene rubber (SBR), butadiene rubber (BR), butyl rubber (IIR), acrylonitrile-butadiene rubber (NBR), carboxylated NBR, hydrogenated NBR, epichlorohydrin-ethylene oxide rubber (GECO), acrylic rubber (ACM), ethylene-propylene-diene rubber (EPDM), polyurethane rubber (PU), fluorinated rubber (FKM) and/or silicone rubber (VMQ), or from a mixture of the rubbers.

Water, one or more paraffins or non-paraffins, one or more inorganic salt hydrates, one or more eutectic alloys, one or more metals and/or one or more metal compounds are advantageously used as a phase change material of the rubber or elastomer compositions according to the invention.

Furthermore $CH_3-(CH_2)_n-CH_3$ with n=14-34 is advantageously used as a paraffin and/or ester, formic acid, caprylic acid, glycerin, D-lactic acid, methyl palmitate, camphenilone, docosyl bromide, caprylone, phenol, 1-cyclohexyloctadecane, 9-heptadecanone, 4-heptadecanone, 3-heptadecanone, 2-heptadecanone, p-toluidine, cyanamide, methyl eicosanoate, hydroxycinnamic acid, cetyl alcohol, α-naphthylamine, camphene, o-nitroaniline, thymol, methylbehenic acid, diphenylamine, p-dichlorobenzene, oxalate, hypophosphorous acid, o-xylene dichloride, nitronaphthalene, trimyristin, beeswax, glycolic acid, p-bromophenol, azobenzene, acrylic acid, phenyl acetate, thiosinaminum, bromocamphor, durene, benzylamine, methyl bromobenzoate, alpha naphthol, glutaric acid, p-xylene dichloride, catechinic acid, quinone, acetanilide, succinic anhydride, benzoic acid, stilbene, benzamide, and/or aliphatic acids, more advantageously caprylic acid, elaidic acid, lauric acid, pentadecanoic acid, heptadecanoic acid, tristearin, myristic acid, palmitic acid, stearic acid, acetamide and/or salts thereof, more advantageously zinc stearate, glyceryl stearate, methyl fumarate, potassium laurate and/or glyceryl laurate are advantageously used as a non-paraffin.

Advantageously, at least one filler, at least one vulcanizing agent, at least one curing agent, at least one crosslinker, at least one accelerator and/or at least one activator, more advantageously sulfur, peroxide and/or zinc oxide (ZnO), are added as auxiliary materials.

Advantageously, reinforcing filler, more advantageously carbon black, calcium carbonate, layered silicate, carbon nanotubes, hydrotalcite, graphene, silica, and/or non-reinforcing filler, more advantageously clay/alumina, calcium carbonate, talcum, and/or antioxidants, more advantageously trimethylquinolone (TQ), are added as a filler.

A polar phase change material is advantageously used a phase change material, or a polar rubber and a polar phase change material are advantageously used.

With the present invention, it is for the first time possible to specify rubber or elastomer compositions in which in particular the elastic modulus can be adapted depending on the temperature and the application conditions, and a method for the production of rubber or elastomer compositions of this type which can be performed in a simple manner and is cost effective.

This is attained in particular with the use of a phase change material in solid or liquid form, which material is present in the rubber or elastomer matrix and changes the phases of the material when a stimulus occurs and, as a result, exerts an influence on the entire material.

In the rubber or elastomer compositions according to the invention, the configuration or dimension of the physical (mechanical, tribological) properties, for example, can be changed by means of a stimulus, such as for example a temperature change or the application conditions, via the adjustment of the elastic modulus. By influencing the stimuli, the phase change process and/or the effects thereof on the changes to and/or in the material can also be controlled. Within the scope of this invention, in particular the strength, specifically tensile strength and compressive strength, stiffness, elasticity, plasticity (ductility), creep strength, hardness, fatigue strength, density, fracture toughness and material damping are to be understood as mechanical properties that can be adapted through changes in the rubber or elastomer compositions via the adjustment of the elastic modulus and can be modified in a desired direction.

The rubber or elastomer compositions according to the invention are intelligent materials that are solids, or solids with liquids, which autonomously react to stimuli, in particular changing temperature conditions.

The phase change material is present in solid or liquid form, in particular depending on the temperature.

For the compositions according to the invention, it is advantageous if the phase change material is used in solid form and in this case has a particle size on the micrometer scale, such as ≤1 μm, advantageously on the submicrometer scale, such as 0.01-0.5 μm.

If water is used as a phase change material, it is advantageously added to the rubber or elastomer composition according to the invention as a liquid or is at least brought into contact with the composition. If the temperature decreases, then the phase change into ice crystals occurs.

According to the invention, both rubber compositions and also elastomer compositions, by which vulcanized rubber compositions are meant within the scope of this invention, are produced with the phase change material and comprise this material after completion of the compositions.

The rubber or elastomer compositions according to the invention are produced in that one or more rubbers having at least 20 to 150 phr of a phase change material in solid or liquid form are used, and one or more auxiliary materials can be added. The phase change material can be mixed with the one or more rubbers and with or without auxiliary materials, or the at least one rubber can at least be brought into contact with the phase change material with or without auxiliary materials. Before or after the addition of the rubbers to or the bringing-into-contact of the rubber(s) with the phase change material, further processing steps can be performed.

If the method is completed at this point, a rubber composition according to the invention is present.

If the rubber composition produced in this manner is vulcanized, then an elastomer composition according to the invention is present.

However, the elastomer composition according to the invention can also be produced in that a rubber composition is produced without a phase change material, with or without auxiliary materials and/or with or without further processing steps, and in that vulcanization of this composition and only subsequent mixing and/or at least bringing-into-contact of this vulcanized composition with the phase change material occur.

In the latter case, it is more advantageous if the phase change material is introduced or brought into contact in liquid form, for example if an elastomer is dipped into water or into liquid wax.

The rubber or elastomer compositions according to the invention thereby comprise at least one phase change material that influences the elastic modulus and thus the mechanical properties, in particular strength and stiffness, of the composition depending on, for example, temperature changes and/or application conditions, wherein the temperature changes advantageously take place below the boiling and/or melting temperature of at least the phase change material.

Advantageously, a phase change material can also be used up to above the melting temperature thereof, and can then influence mechanical properties, in particular with regard to an increased plasticity and/or increased material damping, in the compositions according to the invention, and can also be used as a plasticizer/plasticizing agent.

The changes due to the phase change are advantageously also reversible with the compositions according to the invention.

In the rubber chemical industry, the mass fractions of the individual mixture constituents of an elastomer mixture are indicated in the unit "phr" (parts per hundred rubber), wherein each of these specifications is based on 100 mass parts of the base polymer (Wikipedia, German-language keyword "phr").

According to the present invention, the mass parts thus refer to the rubber or elastomer matrix. The phase change material is present in the compositions according to the invention at ratio of 20 to 150 phr, advantageously 30 to 80 phr.

Furthermore, the phase change material is present such that it is embedded in the rubber or elastomer matrix.

According to the definition of a matrix in a composite material, the particles or fibers there are embedded in the other components of the composite material, which is referred to as the matrix (Wikipedia, German-language keyword "Verbundwerkstoff").

Advantageously, the phase change material is present in the rubber or elastomer matrix in a homogeneously distributed manner. Depending on the application case, however, a graduated distribution of the phase change material in the matrix can also be advantageous. The rubber or elastomer matrix and the phase change material do not have a network-like structure.

Intelligent materials, such as the compositions according to the invention, can be used as a rubber mixture before vulcanization, or also after vulcanization as tires for the vehicle industry or in intelligent medical instruments, artificial muscles, robots, actuators, sensors or microelectromechanical systems.

It is particularly advantageous if the rubber or elastomer compositions according to the invention change their mechanical properties thermoresponsively, and thus are able to adapt the material properties in particular to the ambient temperatures.

According to the invention, the adaptation of the properties to the application conditions is considered to be the degree of mechanical adaptability. Mechanical properties of the rubber or elastomer composition with and without phase change material are thereby considered relative to one another. The degree of mechanical adaptability can thereby for example be a multiple of the elastic modulus of a rubber or elastomer composition according to the invention with phase change material in relation to the elastic modulus of the same elastomer composition without phase change material.

Furthermore, it is particularly advantageous if, in the compositions according to the invention, the polarity of the respective material is taken into consideration. The polarity can play a decisive role in achieving a compatible and stable mixture with regard to the components. Advantageously, the phase change material is polar. Also advantageously, both the rubber and also the phase change material are polar.

Another advantageous property of the elastomer compositions according to the invention is the possible use thereof as vehicle tires, so that the properties of the tire material adapt to the ambient temperature and an improved grip/traction on the ground is present depending on a higher temperature.

The invention is explained below in greater detail with the aid of several exemplary embodiments.

EXAMPLE 1 (PRODUCTION OF A RUBBER COMPOSITION)

100 phr carboxylated NBR (XNBR, carboxylated acrylonitrile-butadiene rubber) was mixed as a rubber with 5 phr ZnO as a curing agent, and 40 phr zinc stearate was added as a phase change material. Zinc stearate melts at 120° C.-130° C.

In a further processing step, the mixture was rolled in a double roller for 20 min and subsequently processed into films.

The rubber composition produced in such a manner had an elastic modulus of 30 MPa up to a temperature of 120° C.

At a temperature above 120° C., the zinc stearate melted in the elastomer composition. The elastic modulus of the elastomer composition was then 3 MPa at 140° C.

The elastic modulus of the rubber composition produced in such a manner improved by a factor of 10 compared to the known rubber composition. The degree of mechanical adaptability was nearly 10.

EXAMPLE 2 (PRODUCTION OF AN ELASTOMER COMPOSITION WITH PHASE CHANGE MATERIAL BEFORE VULCANIZATION)

100 phr epichlorohydrin terpolymer rubber was mixed with 5 phr MTT (3-methylthiazolidone-2-thione) as vulcanizing agent and 5 phr ZnO and 5 phr stearic acid as activator and 1.5 phr sulfur as accelerator, and 40 phr formic acid was added as phase change material. Formic acid was present in liquid form. The phase change of formic acid takes place at a temperature of 8° C.

The starting materials were mixed, and the mixture was then rolled in a double roller for 10 min and subsequently processed into films and vulcanized at 160° C.

The elastomer composition produced in such a manner had a strength of 20 MPa at 0° C.

At 10° C., the elastomer composition had an increased elastic modulus of the elastomer composition of 2 MPa.

The elastic modulus of the rubber composition produced in such a manner improved by a factor of 10 compared to the known rubber composition. The degree of mechanical adaptability was nearly 10.

EXAMPLE 3 (PRODUCTION OF AN ELASTOMER COMPOSITION WITH PHASE CHANGE MATERIAL AFTER VULCANIZATION)

100 phr epichlorohydrin terpolymer rubber was mixed with 5 phr MTT (3-methylthiazolidone-2-thione) as vulcanizing agent and 5 phr ZnO and 5 phr stearic acid as activator and 5 phr mercaptobenzothiazole as accelerator, and the mixture was then rolled in a double roller for 8 min and subsequently processed into films and vulcanized at 160° C.

The elastomer composition produced in such a manner had an elastic modulus of 2 MPa at 20° C.

The elastomer mixture was then completely immersed in distilled water for 4 days at 20° C.

The elastomer composition then had an increased elastic modulus of 10 MPa at a temperature of −5° C.

The material had an elastic modulus of 1 MPa at +5° C.

The elastic modulus of the rubber composition produced in such a manner improved by a factor of 10 compared to the known rubber composition. The degree of mechanical adaptability was nearly 10.

The invention claimed is:

1. A rubber or elastomer composition comprising at least one rubber or elastomer matrix and at least 20 to 150 phr of a phase change material, wherein
    the matrix is produced from at least one natural rubber and/or at least one synthetic rubber comprising styrene-butadiene rubber (SBR), butadiene rubber (BR), butyl rubber (IIR), acrylonitrile-butadiene rubber (NBR), carboxylated NBR, hydrogenated NBR, epichlorohydrin-ethylene oxide rubber (GECO), acrylic rubber (ACM), ethylene-propylene-diene rubber (EPDM), polyurethane rubber (PU), or fluorinated rubber (FKM),
    the phase change material undergoes a phase change at the melting temperature of the phase change material,
    the phase change material undergoes a phase change at a melting temperature which changes or adjusts the elastic modulus of the rubber or elastomer composition,
    the phase change material comprising a material in solid form having a particle size of ≤1 μm, and
    wherein one or more auxiliary materials comprising at least one reinforcing filler selected from the group consisting of carbon black, calcium carbonate, layered silicate, carbon nanotubes, hydrotalcite, graphene, and silica is present.

2. The rubber or elastomer composition according to claim 1, wherein the phase change material has a particle size of 0.01-0.5 μm.

3. The rubber or elastomer composition according to claim 1, wherein the phase change material is present at 30 to 80 phr.

4. The rubber or elastomer composition according to claim 1, wherein the phase change material is present in the matrix in a homogeneously distributed manner or in a graduated distribution.

5. The rubber or elastomer composition according to claim 1, wherein one or more non-paraffins, one or more inorganic salt hydrates, one or more eutectic alloys, one or more metals and/or one or more metal compounds are present as phase change material.

6. The rubber or elastomer composition according to claim 5, wherein formic acid, caprylic acid, glycerin, D-lactic acid, methyl palmitate, camphenilone, docosyl bromide, caprylone, phenol, 1-cyclohexyloctadecane, 9-heptadecanone, 4-heptadecanone, 3-heptadecanone, 2-heptadecanone, p-toluidine, cyanamide, methyl eicosanoate, hydroxycinnamic acid, cetyl alcohol, α-naphthylamine, camphene, o-nitroaniline, thymol, methylbehenic acid, diphenylamine, p-dichlorobenzene, oxalate, hypophosphorous acid, o-xylene dichloride, nitronaphthalene, trimyristin, beeswax, glycolic acid, p-bromophenol, azobenzene, acrylic acid, phenyl acetate, thiosinaminum, bromocamphor, durene, benzylamine, methyl bromobenzoate, alpha naphthol, glutaric acid, p-xylene dichloride, catechinic acid, quinone, acetanilide, succinic anhydride, benzoic acid, stilbene, benzamide, acetamide, esters, aliphatic acids, and/or salts thereof, are present as the one or more non-paraffins.

7. The rubber or elastomer composition according to claim 1, wherein at least one non-reinforcing filler, at least one vulcanizing agent, at least one curing agent, at least one crosslinker, at least one accelerator and/or at least one activator, is also present as the one or more auxiliary materials.

8. The rubber or elastomer composition according to claim 7, wherein at least one non-reinforcing filler, and/or an antioxidant, is present.

9. The rubber or elastomer composition according to claim 1, wherein the phase change material is polar, or the elastomer matrix and the phase change material are polar.

10. A method for the production of the rubber composition of claim 1, the method comprising mixing the at least one rubber, the at least 20 to 150 phr of the phase change material, and the one or more auxiliary materials to obtain a mixed composition, wherein:
  a) the at least one rubber is at least brought into contact with the phase change material prior to mixing with the one or more auxiliary materials, or
  b) the at least one rubber is brought into contact with the phase change material and with the one or more auxiliary materials and mixed.

11. A method for the production of the elastomer composition of claim 1, the method comprising mixing the at least one rubber, the at least 20 to 150 phr of the phase change material, and the one or more auxiliary materials, wherein:
  a) the phase change material is mixed with the at least one rubber and with the one or more auxiliary materials, and subsequently vulcanized, or
  b) the at least one rubber is mixed with the one or more auxiliary materials and vulcanized and subsequently at least brought into contact with the phase change material, or
  c) the at least one rubber is at least brought into contact with the phase change material prior to mixing with the one or more auxiliary materials, and vulcanized.

12. The method according to claim 10 wherein the mixed composition is rolled.

13. The method according to claim 10, wherein the phase change material is in solid form has a particle size of 0.01-0.5 μm is used.

14. The method according to claim 10, wherein 30 to 80 phr phase change material is mixed with the at least one rubber.

15. The method according to claim 10, wherein the phase change material is distributed in the matrix in a homogeneous or graduated manner.

16. The method according to claim 10, wherein the phase change material is one or more non-paraffins, one or more inorganic salt hydrates, one or more eutectic alloys, one or more metals and/or one or more metal compounds.

17. The method according to claim 10, wherein formic acid, caprylic acid, glycerin, D-lactic acid, methyl palmitate, camphenilone, docosyl bromide, caprylone, phenol, 1-cyclohexyloctadecane, 9-heptadecanone, 4-heptadecanone, 3-heptadecanone, 2-heptadecanone, p-toluidine, cyanamide, methyl eicosanoate, hydroxycinnamic acid, cetyl alcohol, α-naphthylamine, camphene, o-nitroaniline, thymol, methylbehenic acid, diphenylamine, p-dichlorobenzene, oxalate, hypophosphorous acid, o-xylene dichloride, nitronaphthalene, trimyristin, beeswax, glycolic acid, p-bromophenol, azobenzene, acrylic acid, phenyl acetate, thiosinaminum, bromocamphor, durene, benzylamine, methyl bromobenzoate, alpha naphthol, glutaric acid, p-xylene dichloride, catechinic acid, quinone, acetanilide, succinic anhydride, benzoic acid, stilbene, benzamide, acetamide, esters, aliphatic acids, and/or salts thereof, are used as the one or more non-paraffins.

18. The method according to claim 10, wherein at least one non-reinforcing filler, at least one vulcanizing agent, at least one curing agent, at least one crosslinker, at least one accelerator and/or at least one activator, are added as the one or more auxiliary materials.

19. The method according to claim 18, wherein at least one non-reinforcing filler, and/or an antioxidant, is added.

20. The method according to claim 10, wherein a polar phase change material is used as phase change material, or a polar rubber and a polar phase change material are used.

21. The rubber or elastomer composition according to claim 6, wherein the one or more non-paraffins comprises caprylic acid, elaidic acid, lauric acid, pentadecanoic acid, heptadecanoic acid, tristearin, myristic acid, palmitic acid, stearic acid, acetamide and/or salts thereof.

22. The rubber or elastomer composition according to claim 6, wherein the one or more non-paraffins comprises zinc stearate, glyceryl stearate, methyl fumarate, potassium laurate and/or glyceryl laurate.

23. The rubber or elastomer composition according to claim 7, wherein the one or more auxiliary materials comprises sulfur, peroxide and/or zinc oxide (ZnO).

24. The rubber or elastomer composition according to claim 8, wherein at least one non-reinforcing filler comprising clay/alumina, calcium carbonate, or talcum, and/or an anti-oxidant comprising trimethylquinolone (TQ) is present.

25. The method according to claim 17 wherein
  the one or more non-paraffins comprises caprylic acid, elaidic acid, lauric acid, pentadecanoic acid, heptadecanoic acid, tristearin, myristic acid, palmitic acid, stearic acid, acetamide and/or salts thereof, and/or
  the one or more auxiliary materials comprises sulfur, peroxide and/or zinc oxide (ZnO), and/or,
  at least one non-reinforcing filler comprises clay/alumina, calcium carbonate, or talcum, and/or an anti-oxidant comprises trimethylquinolone (TQ).

26. The method according to claim 17, wherein the one or more non-paraffins comprises zinc stearate, glyceryl stearate, methyl fumarate, potassium laurate and/or glyceryl laurate.

* * * * *